United States Patent
Kawaguchi et al.

(10) Patent No.: US 9,199,869 B2
(45) Date of Patent: Dec. 1, 2015

(54) METHOD FOR PRODUCING GLASS SUBSTRATE AND GLASS SUBSTRATE

(75) Inventors: Takahiro Kawaguchi, Shiga (JP); Katsutoshi Fujiwara, Shiga (JP); Yoshinari Kato, Shiga (JP); Hisatoshi Aiba, Shiga (JP)

(73) Assignee: NIPPON ELECTRIC GLASS CO., LTD., Otsu-shi, Shiga (JP)

( * ) Notice: Subject to any disclaimer, the term of this patent is extended or adjusted under 35 U.S.C. 154(b) by 0 days.

(21) Appl. No.: 13/636,474

(22) PCT Filed: Mar. 22, 2011

(86) PCT No.: PCT/JP2011/056700
§ 371 (c)(1),
(2), (4) Date: Sep. 21, 2012

(87) PCT Pub. No.: WO2011/118547
PCT Pub. Date: Sep. 29, 2011

(65) Prior Publication Data
US 2013/0017366 A1      Jan. 17, 2013

(30) Foreign Application Priority Data

Mar. 23, 2010   (JP) ................................ 2010-065568
Mar. 8, 2011    (JP) ................................ 2011-049763

(51) Int. Cl.
C03B 17/06    (2006.01)
C03C 3/091    (2006.01)
C03B 25/00    (2006.01)

(52) U.S. Cl.
CPC ............... C03B 17/067 (2013.01); C03C 3/091 (2013.01); *Y10T 428/24355* (2015.01)

(58) Field of Classification Search
USPC ................................ 428/141, 220; 65/41, 83
See application file for complete search history.

(56) References Cited

U.S. PATENT DOCUMENTS 6,815,070 B1    11/2004  Burkle et al.
2004/0065115 A1  4/2004  Mueller et al.
(Continued)

FOREIGN PATENT DOCUMENTS

EP    1 710 212      10/2006
JP    2004-523452     8/2004
(Continued)

OTHER PUBLICATIONS

European Office Action issued Sep. 16, 2013, in European Application No. 11 759 352.5.
(Continued)

*Primary Examiner* — Tahseen N Khan
(74) *Attorney, Agent, or Firm* — Drinker Biddle & Reath LLP

(57) ABSTRACT

The present invention is aimed to provide a method for producing a glass substrate with a thickness of not more than 200 μm, which is satisfied with the quality required for a substrate on which a thin-film electric circuit is formed, and a sheet glass substrate obtained according to this method. The present invention is concerned with a method for producing a glass substrate having a sheet thickness of from 10 to 200 μm, including a forming step of forming a molten glass into a ribbon shape in accordance with a down draw method, an annealing step of annealing the glass ribbon, and a cutting step of cutting the glass ribbon to give a glass substrate, wherein an average cooling rate in a temperature range of from the (annealing point+200° C.) to the (annealing point+50° C.) is controlled to the range of from 300 to 2,500° C./min.

5 Claims, 2 Drawing Sheets

(56) References Cited

U.S. PATENT DOCUMENTS

| | | |
|---|---|---|
| 2005/0160767 A1 | 7/2005 | Novak |
| 2008/0184741 A1 | 8/2008 | Mueller et al. |
| 2009/0019892 A1 | 1/2009 | Fredholm et al. |
| 2009/0226671 A1 | 9/2009 | Yanase et al. |
| 2009/0226733 A1* | 9/2009 | Kato et al. .............. 428/428 |
| 2010/0031702 A1 | 2/2010 | Tomamoto et al. |
| 2011/0177287 A1* | 7/2011 | Kato et al. .............. 428/141 |

FOREIGN PATENT DOCUMENTS

| | | |
|---|---|---|
| JP | 2007-186406 A | 7/2007 |
| JP | 2007-528338 | 10/2007 |
| JP | 2008-105882 A | 5/2008 |
| JP | 2008-184335 | 8/2008 |
| JP | 2009-509896 | 3/2009 |
| JP | 2012-518590 A | 8/2012 |
| TW | I231807 B | 5/2005 |
| TW | 200940459 A | 10/2009 |
| WO | WO 2007/136054 | 11/2007 |
| WO | WO-2009093550 A1 | 7/2009 |

OTHER PUBLICATIONS

Supplementary European Search Report issued Jul. 22, 2013, in European Application No. EP 11 75 9352.

International Search Report mailed Jun. 21, 2011, in International Application No. PCT/JP2011/056700.

International Preliminary Report on Patentability issued Oct. 16, 2012, in International Application No. PCT/JP2011/056700.

Office Action and Search Report issued Dec. 27, 2014 in Taiwanese Patent Application No. 100109981 (4 pages) with English Translation (3 pages).

Office Action issued Jun. 29, 2015 in corresponding Japanese Patent Application No. 2014- 170189 (5 pages) with English Translation (4 pages).

* cited by examiner

METHOD FOR PRODUCING GLASS SUBSTRATE AND GLASS SUBSTRATE

TECHNICAL FIELD

The present invention relates to a glass substrate on which a thin-film electric circuit is formed, in particular to a glass substrate which is used for flat panel displays and flexible displays such as liquid crystal displays, organic EL displays, and the like.

BACKGROUND ART

Glass substrates which are used for a display application are generally formed according to a float method, a down draw method represented by an overflow down draw method, or the like.

The float method is a method of casting a molten glass onto molten tin (float bath) and stretching it in the horizontal direction to form the glass in a sheet form. According to the method, a glass ribbon is formed on the float bath, and the glass ribbon is then annealed (on-line annealed) in a long annealing furnace. Accordingly, the glass substrate formed according to the float method is characterized by having a small thermal shrinkage ratio.

However, the float method involves such disadvantages that it is difficult to make the sheet thin, the glass substrate is required to be polished to remove tin attached onto the glass surface, and the surface quality of the substrate is lowered.

On the other hand, the down draw method is a generic term for a forming method of drawing a glass in the vertical downward direction to form it in a sheet form, and a slot (slit) down draw method, an overflow down draw method, and the like are known. For example, in the overflow down draw method that is widely adopted, a molten glass is introduced into the top of a trough-shaped refractory (forming body) having a nearly wedge-shaped cross section, and the glass is allowed to overflow out from the both side thereof to flow down along the side face, and the two streams are joined together at the lower end of the refractory and drawn downward to form the glass in a sheet form. The down draw method is advantageous in that a glass is easy to be formed into a thin sheet.

Furthermore, in the case of the overflow down draw method, since the glass surface does not come into contact with any other than air, there is also such an advantage that a glass substrate having high surface quality can be obtained even in an unpolished state.

CITED REFERENCES

Patent Documents

Patent Document 1: JP-A-2008-105882
Patent Document 2: JP-A-2008-133174

SUMMARY OF THE INVENTION

Problems that the Invention is to Solve

In recent years, from the viewpoint of space-saving, thinning and weight reduction of flat panel displays such as liquid crystal displays, organic EL displays, etc. are progressing, and as an extension thereof, researches toward flexibilization of the panels are energetically advanced. In addition, because of expansion of electronic paper, new display applications (e.g., electronic book, electronic newspaper, electronic price tag, digital signage, etc.) are being developed, and a requirement for thin and bendable flexible displays expands.

In order to realize a flexible display, the development of a substrate technology is indispensable. A substrate having not only suppleness but barrier properties against oxygen and moisture, etc. is necessary. As the substrate having these characteristics, thin sheet glasses which are made thin as films are regarded as promising. In particular, from the viewpoint of suppleness, glasses which are thinner than 200 μm are desired. Under these circumstances, the development of a method for producing a thin sheet glass by adopting the down draw method is advanced (see, for example, Patent Documents 1 and 2).

Similar to the current flat panel displays, it is expected that requirements, such as high precision, high fineness, etc., will be also increased for the flexible displays. In order to meet these requirements, it is necessary to make a pattern of a thin-film electric circuit finer, and it is thought that a requirement of the surface quality for the substrate will increase more and more. Incidentally, if a surface roughness of the substrate (local unevenness) is large, or a sheet thickness of the substrate (overall unevenness) is not uniform, it is difficult to form a fine circuit pattern.

However, in the case where it is intended to form a thin sheet glass of not more than 200 μm according to the down drawn method, it is difficult to stably draw out the glass from the forming equipment, and it is difficult to keep the uniformity of the sheet thickness. For that reason, there was involved such a problem that the quality required for the substrate on which a thin-film electric circuit is formed cannot be satisfied. In order to make the sheet thickness uniform, it is thought to conduct an off-line polishing treatment. However, it is very technically difficult to polish a glass substrate of not more than 200 μm, and the production costs greatly increase.

An object of the present invention is to provide a method for producing a glass substrate of not more than 200 μm, which is satisfied with the quality required for a substrate on which a thin-film electric circuit is formed, and a thin sheet glass substrate obtained according to this method.

Means for Solving the Problems

As a result of extensive and intensive investigations, the present inventors have found that the foregoing object can be achieved by regulating an average cooling rate of the glass in a temperature region higher than an annealing point to 300° C./min or more and proposed it as the present invention.

That is, a method for producing a glass substrate of the present invention is a method for producing a glass substrate having a sheet thickness of from 10 to 200 μm, including a forming step of forming a molten glass into a ribbon shape in accordance with a down draw method, an annealing step of annealing the glass ribbon, and a cutting step of cutting the glass ribbon to give a glass substrate, wherein an average cooling rate in a temperature range of from the (annealing point+200° C.) to the (annealing point+50° C.) is controlled to the range of from 300 to 2,500° C./min. Incidentally, the "annealing point" is a temperature at which the glass has a viscosity of $10^{13}$ dPa·s, and this can be measured based on the method according to ASTM C336-71. The "average cooling rate" means a rate obtained in such a manner that the time in which a center portion of a glass ribbon in the sheet width direction passes through a prescribed temperature region is calculated, and a temperature difference (here, 150° C.) within this region is divided by the time taken for the passing.

According to the foregoing constitution, a glass substrate having a uniform sheet thickness and having small warpage and residual stress can be obtained by regulating the average cooling rate in a temperature region higher than the annealing point to 300° C./min or more. In addition, since the glass is rapidly cooled to the annealing point, the time (or distance) capable of being taken for the subsequent annealing can be sufficiently secured. As a result, nonetheless a fictive temperature is high, by adequately regulating the subsequent annealing condition, it is possible to produce a glass substrate having a small thermal shrinkage ratio.

Furthermore, in the present invention, it is preferable to regulate an average cooling rate of from the annealing point to the (annealing point−100° C.) to the range of from 10 to 300° C./min.

In the case of increasing a cooling rate of the glass in a temperature region higher than the annealing point to form a sheet glass having a sheet thickness of not more than 200 μm, the fictive temperature of the glass is easy to become high. When the fictive temperature of the glass becomes high, in general, the thermal shrinkage ratio tends to become high. As a result, there is a possibility that the quality required as a substrate for forming a thin-film electric circuit cannot be satisfied. Even in such case, when the foregoing constitution is adopted, nonetheless the sheet thickness is not more than 200 μm, it is possible to obtain a glass substrate having a low thermal shrinkage ratio.

In the present invention, the down draw method is preferably an overflow down draw method.

According to the foregoing constitution, it is possible to produce a substrate for forming a thin-film electric circuit, in particular a glass substrate capable of being used as a substrate of a flexible display, in a surface state at the time of forming as it is. Accordingly, it is possible to omit a polishing step, and this constitution is suitable as a method for producing a thin sheet which is difficult to be polished.

In the present invention, it is preferable to use a glass comprising from 50 to 70% of $SiO_2$, from 10 to 25% of $Al_2O_3$, from 1 to 15% of $B_2O_3$, from 0 to 10% of MgO, from 0 to 15% of CaO, from 0 to 15% of SrO, from 0 to 15% of BaO, and from 0 to 5% of $Na_2O$ in terms of percentage by mass.

According to the foregoing constitution, it is easy to select a glass composition having a high strain point and having a liquidus viscosity suitable for the overflow down draw method. In addition, it is possible to make a glass composition which is excellent in various characteristics required for display substrates, such as chemical resistance, specific modulus, chemical durability, meltability, etc.

The glass substrate of the present invention is a glass substrate having a sheet thickness of from 10 to 200 μm, and it is characterized in that a sheet thickness difference between a maximum sheet thickness and a minimum sheet thickness in the substrate is not more than 30 Jim. Incidentally, the "sheet thickness difference between a maximum sheet thickness and a minimum sheet thickness in the substrate" means a value obtained by measuring thickness variation along an arbitrary line across a glass substrate using a laser type thickness measuring device, determining a maximum thickness and a minimum thickness of the glass substrate, and then subtracting a value of the minimum sheet thickness from a value of the maximum sheet thickness.

According to the foregoing constitution, since the substrate has flexibility, it is possible to use the substrate for an application for a substrate of a flexible display, or the like. In addition, the sheet thickness difference necessary for the substrate on which a thin-film electric circuit is formed can be satisfied.

In the present invention, a residual stress value is preferably not more than 2.5 nm. In the present invention, the "residual stress value" means a retardation value measured using a stress meter according to an optical heterodyne method.

According to the foregoing constitution, the distortion value necessary for the substrate on which a thin-film electric circuit is formed can be satisfied.

In the present invention, a warpage value is preferably not more than 200 μm. Incidentally, in the present invention, the "warpage value" means a value measured by a warpage measurement system.

According to the foregoing constitution, the warpage value necessary for the substrate on which a thin-film electric circuit is formed can be satisfied.

In the present invention, a thermal shrinkage ratio at the time of heating from ordinary temperature at a rate of 5° C./min, keeping at 450° C. for 10 hours, and then cooling at a rate of 5° C./min is preferably less than 300 ppm. Incidentally, in the present invention, the "thermal shrinkage ratio" means a value obtained through the measurement in the following manner. First of all, a strip sample of 160 mm×30 mm is prepared as a sample for the measurement (FIG. 2(a)). Markings are given to the area around from 20 to 40 mm from each end of this strip sample in the long side direction with a #1000 waterproof abrasive paper, and the sample is divided into two pieces along the center line vertical to the markings (FIG. 2(b)). After one of the pieces is heat treated under prescribed conditions, the heat-treated piece and untreated piece are put in parallel (FIG. 2(c)), displacement of the markings ($\Delta L1$ and $\Delta L2$) are measured with a laser microscope, and the thermal shrinkage ratio is calculated according to the following equation.

$$\text{Thermal shrinkage ratio [ppm]} = (\Delta L1\ [\mu m] + \Delta L2[\mu m])/160 \times 10^{-3}$$

According to the foregoing constitution, there is brought such an effect that even when the heat treatment is applied in the forming step of a thin-film circuit pattern, a pattern displacement is hardly caused.

In the present invention, an average surface roughness Ra is preferably not more than 0.3 nm. Incidentally, in the present invention, the "average surface roughness Ra" means a value measured according to a method in conformity with the "FPD Glass Substrate Surface Roughness Measurement Method" in SEMI D7-94.

So far as the foregoing constitution can be directly achieved by adopting the overflow down draw method or the like, it is possible to omit the polishing step.

In the present invention, the substrate is preferably composed of a glass comprising from 50 to 70% of $SiO_2$, from 10 to 25% of $Al_2O_3$, from 1 to 15% of $B_2O_3$, from 0 to 10% of MgO, from 0 to 15% of CaO, from 0 to 15% of SrO, from 0 to 15% of BaO, and from 0 to 5% of $Na_2O$ in terms of percentage by mass.

According to the foregoing constitution, since the glass has a high strain point, and a liquidus viscosity suitable for the overflow down draw method, a glass which is low in the thermal shrinkage ratio and excellent in the surface quality can be obtained without being polished.

In the present invention, it is preferable to use the substrate as a substrate for forming a thin-film electric circuit, in particular a substrate of a flexible display.

According to the foregoing constitution, the characteristic features of the present invention that not only the sheet thickness is small, but the surface quality is excellent can be made the best use.

MODES FOR CARRYING OUT THE INVENTION

Figure 1:
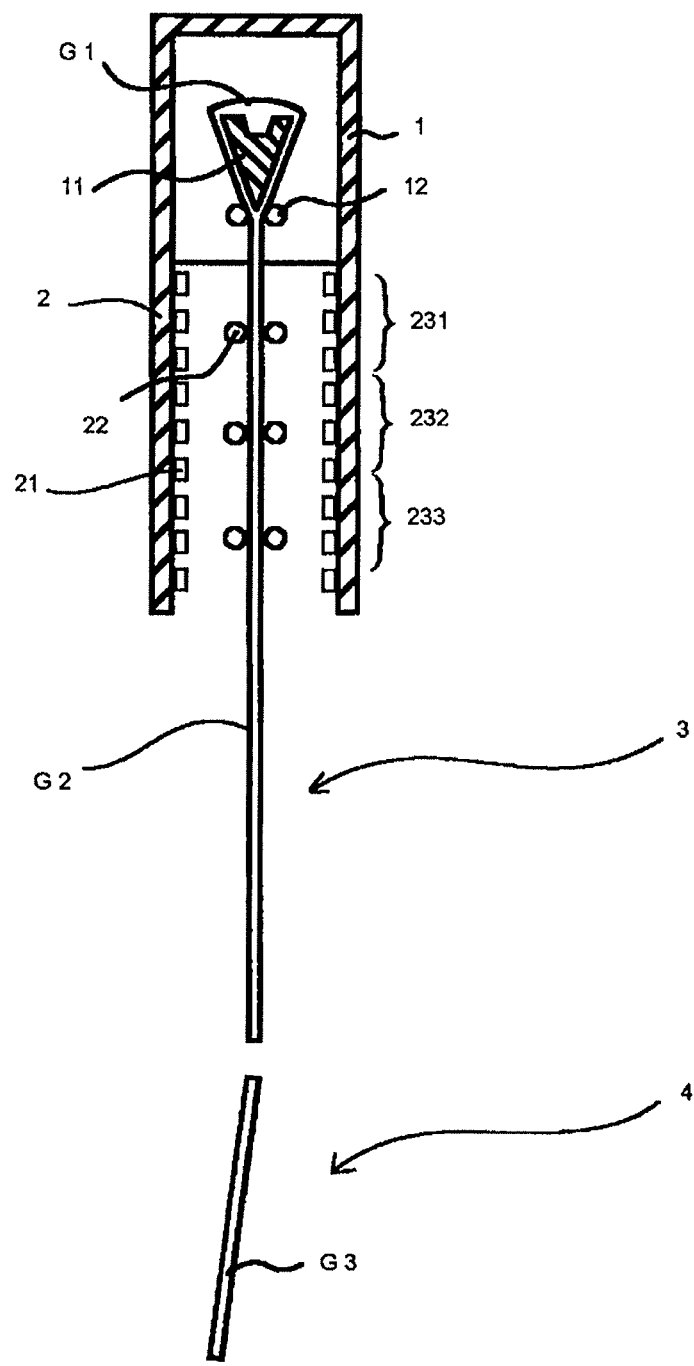
FIG. 1 is an outline front view showing production equipment for a glass substrate in carrying out the present invention.

The method of the present invention is described in detail.

First of all, the method of the present invention includes a forming step of forming a molten glass into a ribbon shape in accordance with a down draw method. In this forming step, it is important to regulate forming conditions such that a sheet thickness of the glass to be finally obtained is from 10 to 200 µm. The sheet thickness can be regulated by controlling a flow rate of the glass, a forming temperature, a rate of drawing the glass (sheet drawing rate), and the like. Incidentally, as for the forming conditions, it is preferable to regulate the sheet thickness of the glass to be obtained to from 10 to 150 µm, in particular from 10 to 100 µm.

Though the forming method is not particularly limited so far as it is the down draw method, it is preferable to adopt the overflow down draw method capable of producing a ribbon-shaped glass with a favorable surface quality without conducting polishing. The reason why when the overflow down draw method is adopted, a ribbon-shaped glass with a favorable surface quality can be produced resides in the matter that the side thereof serving as a surface of the ribbon does not come into contact with any other than air and is formed in a free-surface state. Incidentally, the overflow down draw method is a method in which a molten glass is allowed to overflow out from the both side of a heat-resistant trough-shaped structure, and the overflown glasses are drawn and formed downward while being joined together at a lower end of the trough-shaped structure, thereby producing a ribbon-shaped glass. The structure and material quality of the trough-shaped structure are not particularly limited so far as the dimension or surface precision of the ribbon-shaped glass, or the quality required for a predetermined application can be realized. In addition, for the downward drawing, any method for applying a force to the ribbon-shaped glass may be adopted. For example, a method in which the molten glass is drawn by rotating heat-resistant rollers having a sufficiently large width in a state of being brought into contact with the ribbon-shaped glass may be adopted; and a method in which the molten glass is drawn while bringing plural pairs of heat-resistant rollers into contact with only around the both end surfaces of the ribbon-shaped glass may be adopted.

Incidentally, in the present invention, in addition to the overflow down draw method, various down draw methods can be adopted. For example, it is possible to adopt a slot down method, a redraw method, or the like.

The method of the present invention comprises an annealing step of cooling the glass formed into a ribbon shape. In this step, in a process of cooling the high-temperature ribbon-shaped glass immediately after forming, control of the sheet thickness, removal of the residual stress or warpage, reduction of the thermal shrinkage, and the like are conducted. In particular, the present invention is characterized by controlling the cooling rate to a specified rate in a temperature region of the annealing point or higher at which the sheet thickness, residual stress, or warpage is greatly influenced. Specifically, an average cooling rate in a temperature range of from the (annealing point+200° C.) to the (annealing point+50° C.) is controlled to the range of from 300 to 2,500° C./min, preferably from 300 to 2,000° C./min, from 300 to 1,500° C./min, from 400 to 1,000° C./min, from 500 to 900° C./min, and especially preferably from 600 to 800° C./min. Incidentally, for the sake of convenience, the temperature range of from the (annealing point+200° C.) to the (annealing point+50° C.) is hereinafter referred to as "first annealing temperature region".

Incidentally, the temperature of the glass can be determined by means of non-contact measurement with a pyrometer or contact measurement utilizing a thermocouple.

When the cooling rate of the first annealing temperature region is too low, the shape of the glass sheet is not rapidly defined, and hence, it is difficult to make the sheet thickness uniform. In addition, the time (or distance) capable of being taken for the subsequent annealing becomes short, and hence, the thermal shrinkage ratio becomes large. On the other hand, when the cooling rate of the first annealing temperature region is too high, the glass is rapidly cooled, and hence, a non-uniform, large residual stress is generated, resulting in deterioration of the warpage. In addition, the fictive temperature of the glass becomes too high, and therefore, even by regulating the subsequent annealing conditions, it is difficult to sufficiently decrease the thermal shrinkage ratio.

Incidentally, the fictive temperature is a temperature of a supercooled liquid having the same structure as a glass structure, and this is an index of the structure of glass. Glass is low in viscosity and liquidus at a high temperature, and in this stage, the glass has an open structure. Then, when the glass is cooled, the glass structure becomes dense and is frozen. This glass structure change occurs because the glass is likely to be in the most stable state at that temperature. However, when the cooling rate of glass is high, the glass structure is frozen before it has a dense structure corresponding to that temperature, so that the glass structure is frozen in a state of a high-temperature side. The temperature corresponding to the solidified glass structure is said to be a fictive temperature. When the fictive temperature is higher, the glass structure is more open and therefore, the thermal shrinkage ratio becomes large. However, when the subsequent annealing is adequately conducted, it is possible to make the thermal shrinkage ratio small. In the case of carrying out the method of the present invention, the fictive temperature of the glass substrate is easy to fall within the range of from the (annealing point+45° C.) to the (annealing point+100° C.), in particular the range of from the (annealing point+45° C.) to the (annealing point+80° C.), and moreover the range of from the (annealing point+45° C.) to the (annealing point+60° C.). In the case of the method of the present invention, according to a fast cooling rate in the first annealing region, the time capable of being taken for the annealing in a temperature region of not higher than the annealing point can be ensured long. Therefore, by adequately regulating the annealing conditions, nonetheless the fictive temperature is high, a glass substrate having a practically acceptable thermal shrinkage ratio can be obtained.

The "fictive temperature" is a temperature determined as follows. First of all, the same glass piece as that in the thermal shrinkage determination is put into an electric furnace controlled at the annealing point temperature, and after one hour, the glass piece is taken out of the electric furnace and rapidly cooled on an aluminum plate, followed by measuring a thermal shrinkage ratio thereof. The same treatment is carried out at the (annealing point+20° C.), the (annealing point+40° C.), and the (annealing point+60° C.), respectively, and a graph of a relationship between the treatment temperature and the thermal shrinkage ratio is prepared. A heat treatment temperature at which the thermal shrinkage ratio is 0 ppm is determined from a linear approximate curve of this graph, and this is defined as the fictive temperature of glass.

Now, in the down draw method, in view of the relationship that an annealing furnace is provided just below the forming body, it is actually impossible to dispose a long annealing furnace like that in the float method. Accordingly, the annealing furnace is necessarily short. In other words, the cooling rate within the annealing furnace is fast, and a glass is frozen in a high temperature state, and therefore, it is difficult to obtain a glass substrate having a small thermal shrinkage ratio.

In liquid crystal displays or organic EL displays, a thin-film electric circuit such as a thin film transistor (TFT) is formed on the surface of a glass substrate. In this forming process, when the glass substrate is exposed to a high-temperature atmosphere, structural relaxation is advanced, and its volume shrinks (thermally shrinks). When the glass substrate thermally shrinks in a forming step of a thin-film electric circuit, the shape and dimension of the circuit pattern deviate from the designed values, whereby desired electric performances are not obtainable. For that reason, it is required that the thermal shrinkage of the substrate on which a thin-film electric circuit is formed is small.

Then, in the method of the present invention, it is preferable to regulate an average cooling rate in a temperature range of from the annealing point to the (annealing point−100° C.), which is a temperature region subsequent to the first annealing temperature region, to the range of from 10 to 300° C./min. In particular, it is desirable to regulate the average cooling rate to the range of from 10 to 200° C./min, from 10 to 150° C./min, and from 50 to 150° C./min. Incidentally, for the sake of convenience, the temperature range of from the annealing point to the (annealing point−100° C.) is hereinafter referred to as "second annealing temperature region". The second annealing temperature region is a temperature region at which the thermal shrinkage ratio is greatly influenced, and by passing through this region at the foregoing cooling rate, nonetheless the fictive temperature is high, a glass substrate having a practically acceptable thermal shrinkage ratio can be produced. When the cooling rate in this range is too low, in the case of the present invention for forming a glass according to the down draw method, a glass melting apparatus or a forming furnace must be set at higher sites, so that there is a concern that this brings about limitations from the standpoint of designing the equipment. On the other hand, when the cooling rate is too high, the time capable of being taken for the annealing is short, and hence, as a result, it becomes difficult to reduce the thermal shrinkage ratio.

Incidentally, in the method of the present invention, it is desirable that in the annealing step, an average cooling rate in a temperature region positioning between the first annealing temperature region and the second annealing temperature region, namely in a temperature range of from the (annealing point+50° C.) to the annealing point, is set lower than the cooling rate in the first annealing temperature region and higher than the cooling rate in the second annealing temperature region. Incidentally, for the sake of convenience, the temperature range of from the (annealing point+50° C.) to the annealing point is hereinafter referred to as "intermediate annealing temperature region". By setting the cooling rate in the intermediate annealing temperature region as described above, a change of the cooling rate from the first annealing temperature region to the second annealing temperature region can be smoothly achieved.

The method of the present invention comprises a cutting step of cutting the ribbon-shaped glass after completion of the annealing into a prescribed length to form a glass substrate. The cutting as referred to herein is not limited to the case of cutting off the ribbon-shaped glass directly every sheet. That is, the cutting includes the case where the ribbon-shaped glass is once wound up in a roll form and then subjected to various processings such as rewinding, sheet width adjustment, film coating, etc., and thereafter, the ribbon-shaped glass is again drawn out and cut every sheet. For the cutting, various methods such as a method for previously making a scribed line on a glass with a cutter or a laser light and then divided the glass, a method for fusing a glass with a laser light, etc. can be adopted.

In the method of the present invention, it is desirable that the surface of the obtained glass substrate is not subjected to polishing. Namely, in a glass having a sheet thickness of from 10 to 200 µm, the possibility of breakage during polishing process is very high. Accordingly, when polishing is applied, a production yield becomes low, and special equipment for preventing the breakage caused during polishing process is needed, and hence, the costs increase. Moreover, when polishing is conducted, the glass surface is scratched, and the original strength of glass is impaired. Incidentally, in order to obtain a glass substrate having an excellent surface quality even without applying polishing, an overflow down draw method may be adopted as the forming method. Incidentally, the "surface" as referred to in this description means a translucent surface (or a main surface) of the glass substrate, and it is differentiated from an edge surface to which polishing is applied for the purpose of preventing cracking, etc.

In the method of the present invention, it is preferable to use a glass having a liquidus viscosity of $10^{4.5}$ dPa·s or more. In particular, in the case of forming a glass according to the overflow down draw method, it is important that the liquidus viscosity of the glass is high. Specifically, the liquidus viscosity of the glass is preferably $10^{4.5}$ dPa·s or more, $10^{5.0}$ dPa·s or more, $10^{5.5}$ dPa·s or more, and $10^{6.0}$ dPa·s or more. Incidentally, the liquidus viscosity is a viscosity at the temperature of precipitation of a crystal, and a composition having a higher liquidus viscosity is more hardly devitrified at the time of glass forming and is easier to be formed into a glass.

In the method of the present invention, it is preferable to use a glass having a strain point of 600° C. or higher. The stain point as referred to herein means a temperature at which the glass has a viscosity of $10^{14.5}$ dPa·s. According to this constitution, it is easy to produce a glass substrate having a small thermal shrinkage ratio.

The method of the present invention can be applied to various glasses. For example, in the case of expecting the use for a liquid crystal display, an organic EL display, etc., a glass comprising from 50 to 70% of $SiO_2$, from 10 to 25% of $Al_2O_3$, from 1 to 15% of $B_2O_3$, from 0 to 10% of MgO, from 0 to 15% of CaO, from 0 to 15% of SrO, from 0 to 15% of BaO, and from 0 to 5% of $Na_2O$ in terms of percentage by mass may be used. So far as the composition falls within this range, it is easy to design a glass composition having a high strain point and having a liquidus viscosity suitable for down draw forming.

In the glass substrate obtained by the present invention, by adequately regulating the first annealing temperature region, it is possible to regulate a sheet thickness difference between a maximum sheet thickness and a minimum sheet thickness in the substrate to not more than 30 µm, in particular not more than 25 µm, and moreover not more than 20 µm. In the case where the sheet thickness difference is too large, it is difficult to conduct accurate patterning of an electrode, etc., and faults such as disconnection or short circuit of a circuit electrode, etc. are easily caused.

In the glass substrate obtained by the present invention, by adequately regulating the first annealing temperature region, it is possible to regulate a residual stress value to not more than 2.5 nm, in particular not more than 2.2 nm, and moreover not more than 2.0 nm. When the residual stress value is too large, there are caused such faults that a pattern deviates at the time of cutting the glass substrate; that in an application of liquid crystal display substrate, a homogenous image is not obtained due to birefringence; and the like.

In the glass substrate obtained by the present invention, by adequately regulating the first annealing temperature region, it is possible to regulate a warpage value to not more than 200 μm, in particular not more than 100 μm, and moreover not more than 80 μm. When the warpage value is too large, it is difficult to conduct accurate patterning of an electrode, etc., and faults such as disconnection or short circuit of a circuit electrode, etc. are easily caused.

In the glass substrate obtained by the present invention, a thermal shrinkage ratio at the time of heating from ordinary temperature at a rate of 5° C./min, keeping at 450° C. for 10 hours, and then cooling at a rate of 5° C./min is easy to become less than 300 ppm. Since it is preferable that the thermal shrinkage ratio of the glass is smaller, by adequately regulating the second annealing temperature region, it is possible to control the thermal shrinkage ratio of glass to not more than 250 ppm, moreover not more than 200 ppm, and in particular not more than 100 ppm. When the thermal shrinkage ratio is too large, in the case where the glass substrate is used as a substrate for forming a thin-film electric circuit, the circuit pattern deviates from the expected design, and electric performances cannot be maintained.

In the glass substrate obtained by the present invention, by forming a glass substrate according to the overflow down draw method and omitting the polishing step, it is possible to regulate an average surface roughness Ra to not more than 0.3 nm, in particular not more than 0.2 nm. Incidentally, the average surface roughness of a glass to which polishing is applied exceeds 0.3 nm.

Next, the glass substrate of the present invention is described.

Various characteristic features of the glass substrate of the present invention, such as sheet thickness, sheet thickness difference, distortion value, warpage value, thermal shrinkage ratio, surface roughness, composition, etc., are those as already described, and a description thereof is omitted herein. In addition, the glass substrate of the present invention can be produced according to the method of the present invention as described above.

Incidentally, in the glass sheet of the present invention, its sheet width is not particularly limited. The sheet width can be varied by regulating the length of a slot or the like from which a glass is drawn out in the case of the slot down draw method, or by regulating the length of a forming body or the like in the case of the overflow down draw method.

The glass substrate of the present invention can be used for various applications. For example, the glass substrate of the present invention can be used as a glass substrate on which a thin-film electric circuit is formed. Since the glass substrate of the present invention has a uniform sheet thickness and has a small residual stress value or warpage value, the quality required for a substrate on which a thin-film electric circuit is formed can be satisfied. Furthermore, when the thermal shrinkage ratio is made small, the substrate hardly causes thermal shrinkage by the heat treatment in the forming step of a thin-film electric circuit, and problems such as a displacement of the circuit pattern, etc. can be easily avoided.

In addition, it is preferable to use the glass substrate of the present invention as a substrate for a flexible display. In view of the fact that the glass substrate of the present invention has a small sheet thickness, it has flexibility, and suppleness necessary as a flexible display substrate can be obtained.

EXAMPLES

The present invention is hereunder described in detail by reference to the accompanying drawings.

FIG. 1 is an outline front view showing production equipment for a glass substrate in carrying out the present invention. The production equipment is for producing a glass substrate according to an overflow down draw method, and it includes a forming furnace 1 having a trough-shaped forming body 11 and cooling rollers 12 therein in this order from the top thereof; an annealing furnace 2 disposed in a lower portion of the forming furnace 1 and having heaters 21 and guide rollers 22 therein; and a cooling section 3 and a cutting section 4 provided in a lower portion of the annealing furnace 2.

The trough-shaped forming body 11 has a nearly wedge-shaped cross section and allows a molten glass G1 to be fed to overflow out from the top thereof and fuse at the bottom thereof to form a glass ribbon G2. The annealing furnace 2 anneals the glass ribbon G2. In detail, in the inside of the annealing furnace 2, a plural number of the panel heaters 21 are provided at the both side of the glass ribbon G2 facing to the glass ribbon G2. The heaters 21 are disposed in plural series and in plural rows in the conveyance direction (vertical direction) and in the sheet width direction (horizontal direction), and the temperature thereof can be independently controlled. The cooling section 3 thoroughly cools the annealed glass ribbon G2. The cutting section 4 cuts the cooled glass ribbon G2 into a prescribed dimension. In addition, in the cutting section 4, a conveyance route for conveying a glass substrate G3 into a non-illustrated subsequent step (for example, a packing step, etc.) is separately provided.

Next, the production method for a glass substrate of the present invention using the foregoing production equipment is described.

In this production equipment, first of all, the molten glass G1 is fed to the top of the trough-shaped forming body 11 provided within the forming furnace 1, and the molten glass G1 is then allowed to overflow out from the top of the trough-shaped forming body 11 and fuse at the bottom thereof to form the glass ribbon G2 in a sheet form. Around the trough-shaped forming body 11, a pair of the cooling rollers 12 is provided. In view of the fact that the glass ribbon G2 is sandwiched between the cooling rollers 12 at its both edges, its both ends are cooled, so that the shrinkage in the width direction is minimized.

Next, the formed glass ribbon G2 is annealed in the annealing furnace 2 to reduce the thermal shrinkage ratio thereof. In the annealing furnace 2, plural pairs of the guide rollers 22 are disposed in the vertical direction and grasp the glass ribbon G2 to guide it downward. In addition, the inside of the annealing furnace 2 is sectioned into a first annealing zone 231 corresponding to the first annealing temperature region (from the (annealing point+200° C.) to the (annealing point+50° C.)), an intermediate annealing zone 232 corresponding to the intermediate annealing temperature region (from the (annealing point+50° C.) to the annealing point), and a second annealing zone 233 corresponding to the second annealing temperature region (from the annealing point to the (annealing point−100° C.)), and an output of each heater 21 is controlled such that the cooling rate in every zone differs from each other.

In the cooling section 3 provided in a lower portion of the annealing furnace 2, the glass ribbon G2 is cooled to substantially room temperature by means of natural cooling.

In the cutting section 4 provided just below the cooling section 3, the glass ribbon cooled to the vicinity of room temperature is cut into the glass sheet G3 having a prescribed dimension and conveyed into the subsequent step.

Using the foregoing production equipment, a glass substrate having a composition containing 60% of $SiO_2$, 15% of $Al_2O_3$, 10% of $B_2O_3$, 8% of CaO, 5% of SrO, and 2% of BaO in terms of percentage by mass and having a size of 500 mm×650 mm×100 μm in thickness (annealing point: 705° C., strain point: 655° C.) was produced under two kinds of annealing conditions. The annealing condition (average cooling rate), the fictive temperature, the thermal shrinkage ratio, the average surface roughness Ra, the sheet thickness difference, the residual stress value, and the warpage value are shown in Table 1. Incidentally, in producing the foregoing glass, the respective zones were set such that the first annealing temperature region was from 905 to 755° C., the intermediate annealing temperature region was from 755 to 705° C., and the second annealing temperature region was 705 to 605° C.

Incidentally, the average cooling rate was computed based on the temperature of the glass measured with a pyrometer.

TABLE 1

|  | Example 1 | Example 2 | Example 3 |
|---|---|---|---|
| Annealing condition (° C./min) | | | |
| First annealing zone | 750 | 750 | 420 |
| Intermediate annealing zone | 150 | 530 | 380 |
| Second annealing zone | 120 | 250 | 120 |
| Fictive temperature (° C.) | 760 | 760 | 750 |
| Average surface roughness Ra (nm) | 0.2 | 0.2 | 0.2 |
| Sheet thickness difference (nm) | 15 | 15 | 20 |
| Residual stress value (nm) | 1.5 | 1.5 | 1.3 |
| Warpage (μm) | 70 | 70 | 60 |
| Thermal shrinkage ratio (ppm) | 40 | 50 | 40 |

As is clear from the table, it is noted that when the average cooling rate in the first annealing temperature region is high, the sheet thickness difference becomes small, and when the average cooling rate in the second annealing temperature region is low, the thermal shrinkage ratio becomes small. In addition, in Examples 1 and 3, 100 μm-thick glass substrates having excellent surface quality and a thermal shrinkage ratio of 40 ppm were obtained.

Incidentally, the strain point and the annealing point were measured based on the method according to ASTM C336-71.

The fictive temperature was determined as follows. First of all, the same glass piece as that in the foregoing thermal shrinkage determination was put into an electric furnace controlled at 705° C., and after one hour, the glass piece was taken out of the electric furnace and rapidly cooled on an aluminum plate, followed by measuring a thermal shrinkage ratio thereof. The same treatment was carried out at 725° C., 745° C., and 765° C., respectively, and a graph of a relationship between the treatment temperature and the thermal shrinkage ratio was prepared. A heat treatment temperature at which the thermal shrinkage ratio was 0 ppm was determined from a linear approximate curve of this graph, and this was defined as the fictive temperature of glass.

The average surface roughness Ra was measured according to a method in conformity with the "FPD Glass Substrate Surface Roughness Measurement Method" in SEMI D7-94.

The residual stress value was measured using a stress meter, manufactured by Uniopt Corporation, Ltd. according to an optical heterodyne method.

The warpage value was measured as follows. That is, a sample having a size of 550 mm×650 mm, as cut out from the center portion of the glass substrate, was measured with a glass substrate warpage measurement system, manufactured by Toshiba Corporation.

A value obtained by measuring thickness variation along an arbitrary line across a glass substrate using a laser type thickness measuring device, determining a maximum thickness and a minimum thickness of the glass substrate, and then subtracting a value of the minimum sheet thickness from a value of the maximum sheet thickness was defined as the sheet thickness difference.

Figure 2:
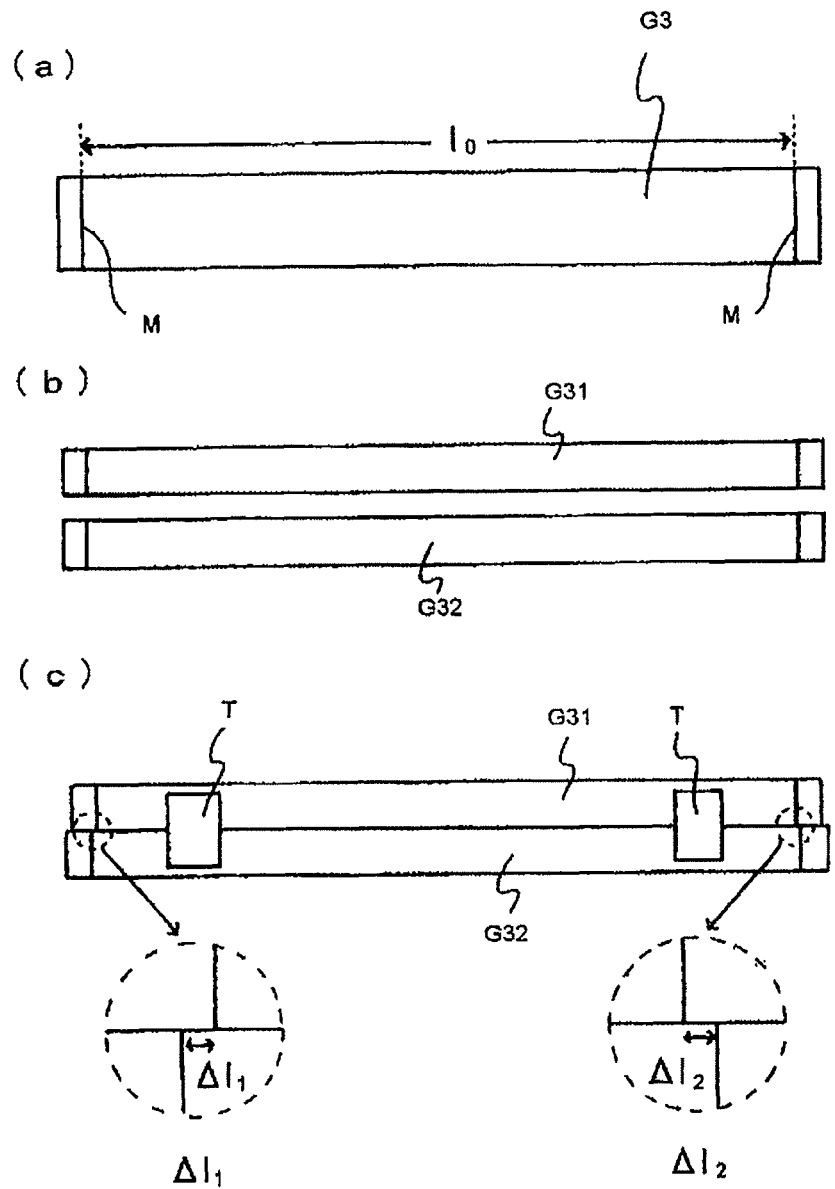
FIGS. 2(a) to 2(c) are explanatory views showing a method for thermal shrinkage ratio determination.

The thermal shrinkage ratio was determined as follows. As shown in FIG. 2(a), linear markings were given to predetermined sites of the glass sheet G3; and thereafter, as shown in FIG. 2(b), this glass sheet G3 was broken vertically to markings M and divided into two glass sheet pieces G31 and G32. Then, only one glass sheet piece G31 was subjected to a predetermined heat treatment (heating from ordinary temperature at a rate of 5° C./min, keeping at 450° C. for a holding time of 10 hours, and then cooling at a rate of 5° C./min). Thereafter, as shown in FIG. 2(c), the heat-treated glass sheet piece G31 and the untreated glass sheet G32 were put in parallel, the both were fixed with an adhesive tape T, and a marking displacement was determined. The thermal shrinkage ratio was calculated according to the following numerical formula 1.

$$S = \frac{\Delta l_1 (\mu m) + \Delta l_2 (\mu m)}{l_0 (mm)} \times 10^3 \text{ (ppm)} \quad \text{Numerical Formula 1}$$

While the present invention has been described in detail and with reference to specific embodiments thereof, it will be apparent to one skilled in the art that various changes and modifications can be made therein without departing from the spirit and scope thereof.

Incidentally, the present application is based on a Japanese patent application filed on Mar. 23, 2010 (Japanese Patent Application No. 2010-65568) and a Japanese patent application filed on Mar. 8, 2011 (Japanese Patent Application No. 2011-49763), the entire contents of which are incorporated herein by reference. All references cited herein are incorporated in their entirety.

INDUSTRIAL APPLICABILITY

The glass sheet produced according to the method of the present invention is suitable as a substrate for flat panel displays which are required to achieve thinning and weight reduction, such as liquid crystal displays, organic EL displays, etc., and a substrate for displays which are required to have flexibility. Furthermore, the present invention can be used for new display applications requiring a thin-film electric circuit, such as electronic paper, digital signage, etc.

DESCRIPTION OF REFERENCE NUMERALS AND SIGNS

1: Forming furnace
11: Trough-shaped forming body
12: Cooling roller
2: Annealing furnace 21: Heater
22: Guide roller
231: First annealing zone
232: Intermediate annealing zone
233: Second annealing zone
3: Cooling section
4: Cutting section
G1: Molten glass
G2: Glass ribbon
G3: Glass sheet
G31, G32: Glass sheet piece
M: Marking
T: Tape

The invention claimed is:

1. A method for producing a glass substrate having a sheet thickness of from 10 to 200 μm, which comprises;
   a forming step of forming a molten glass into a ribbon shape in accordance with a down draw method;
   an annealing step of annealing the glass ribbon; and
   a cutting step of cutting the glass ribbon to obtain a glass substrate,
   wherein in the annealing step, an average cooling rate in a temperature range of a first annealing temperature region defined from the (annealing point+200° C.) to the (annealing point+50° C.) is controlled to be greater than 300° C./min and less than or equal to 2,500° C./min, and
   an average cooling rate in a temperature range of a second annealing temperature region defined from the annealing point to the (annealing point−100° C.) is controlled to be in a range from 50 to 300° C./min.

2. The method for producing a glass substrate according to claim 1, wherein the average cooling rate in the temperature range of the first annealing temperature region is controlled to be equal to or greater than 400° C./min and less than or equal to 2,500° C./min.

3. The method for producing a glass substrate according to claim 1, wherein the down draw method is an overflow down draw method.

4. The method for producing a glass substrate according to claim 1, wherein a glass comprising from 50 to 70% of $SiO_2$, from 10 to 25% of $Al_2O_3$, from 1 to 15% of $B_2O_3$, from 0 to 10% of MgO, from 0 to 15% of CaO, from 0 to 15% of SrO, from 0 to 15% of BaO, and from 0 to 5% of $Na_2O$ in terms of percentage by mass is used.

5. The method for producing a glass substrate according to claim 1, wherein
   an average cooling rate in a temperature range from the (annealing point+50° C.) to the annealing point is set lower than the cooling rate in the first annealing temperature region, and is set higher than the cooling rate in the second annealing temperature region.

* * * * *